F. W. HOCHSTETTER & E. H. PRYCE.
CINEMATOGRAPHIC DEVICE.
APPLICATION FILED MAR. 6, 1914.

1,255,421.

Patented Feb. 5, 1918.
2 SHEETS—SHEET 1.

Witnesses:
Charles C. Abbe
M. Dermody.

Inventors
F. W. Hochstetter & E. H. Pryce.
By their Attorney
W. T. Criswell.

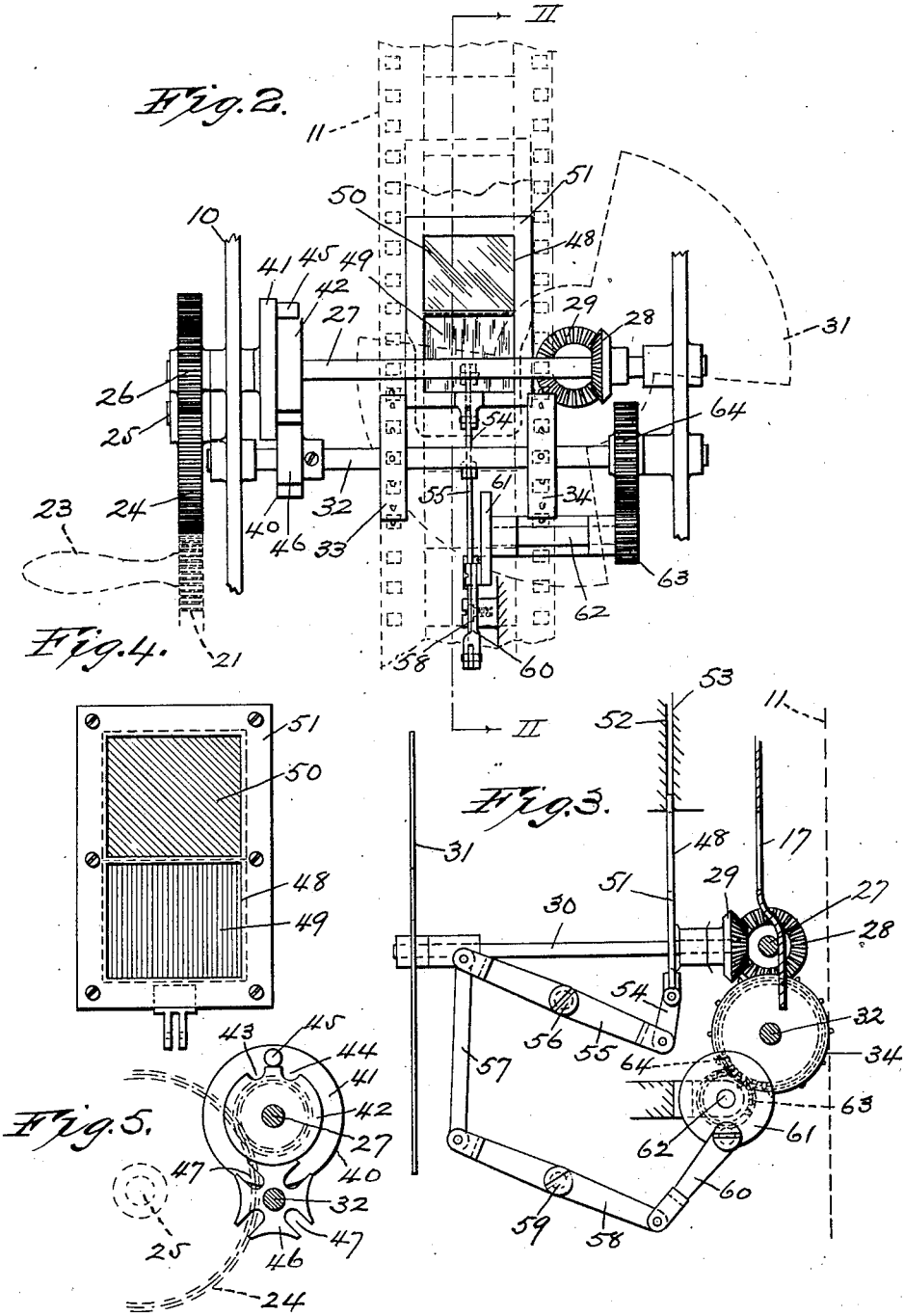

UNITED STATES PATENT OFFICE.

FREDERICK W. HOCHSTETTER AND EDMUND HUGH PRYCE, OF NEW YORK, N. Y., ASSIGNORS TO H. P. PATENTS AND PROCESSES COMPANY, INC., A CORPORATION OF NEW YORK.

CINEMATOGRAPHIC DEVICE.

1,255,421.      Specification of Letters Patent.      Patented Feb. 5, 1918.

Application filed March 6, 1914. Serial No. 822,881.

*To all whom it may concern:*

Be it known that we, FREDERICK W. HOCHSTETTER and EDMUND HUGH PRYCE, a subject of the Emperor of Germany and a subject of the King of England, respectively, and both residents of New York, county and State of New York, have invented a certain new and useful Improvement in Cinematographic Devices, of which the following is a full, clear, and exact specification.

This invention relates to a class of devices adapted to be used for producing and exhibiting animated pictures of objects in their natural colors.

Our invention has for its object primarily to provide a cinematographic device designed to be employed in conjunction with a camera for taking on a sensitized film a series of animated pictures of objects as well as being employed in conjunction with a cinetoscope for projecting the pictures in their natural colors. This is accomplished mainly by providing a transparent screen in the form of a plate composed preferably of two successive color divisions, each representing a separate color, such as red and green, and when a series of the pictures are taken the color-screen is disposed between a sensitized film and the lens of the camera. The color-screen is caused to be reciprocated in a vertical direction intermittently across the plane of the exposures of the sensitized film during its intermittent transmission before the lens so that each successive exposure of the negative will be alternately affected by each of the color divisions. The negative having the color values of the objects thus recorded thereon is converted to a positive in the usual manner, and when the color-screen is employed in conjunction with a cinetoscope it is interposed between the film provided with the pictures and the screen on which the images are projected in a manner whereby the color divisions occupy corresponding positions relatively to the positive as they occupied when the negative was produced.

Another object of the invention is to provide mechanism which is operated in unison with the operation of the means for transmitting the film so that the color-screen will be reciprocated simultaneously and at the same speed as the film is traveled; and still another object of the invention is to provide means serving to intermittently check the transmission of the film and the reciprocation of the color-screen synchronously.

With these and other objects in view, the invention will be hereinafter more particularly described with reference to the accompanying drawings forming a part of this specification, in which similar characters of reference indicate corresponding parts in all the views, and will then be pointed out in the claims at the end of the description.

In the drawings, Figure 1 is a side elevation, partly fragmentary, and partly broken away, of one form of cinematographic device embodying our invention.

Fig. 2 is a fragmentary view, showing an enlarged front elevation of the color-screen and the mechanism for reciprocating the screen intermittently as well as for intermittently transmitting the film in unison therewith.

Fig. 3 is an enlarged view taken on the line II—II of Fig. 2.

Fig. 4 is an enlarged front elevation of the color-screen, and

Fig. 5 is an enlarged fragmentary view, showing an elevation of the means for intermittently checking the transmission of the film and for intermittently checking the reciprocation of the color-screen.

Figure 1:
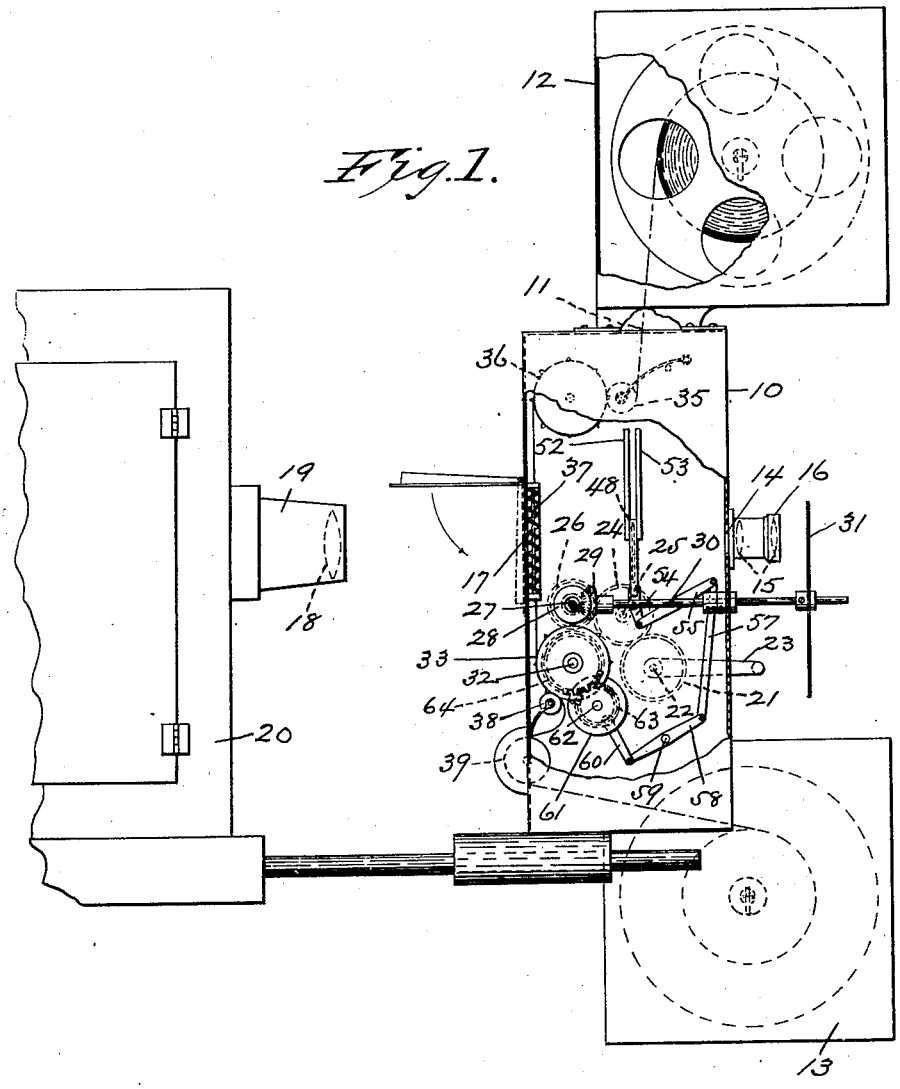

The cinematographic device is adapted to be used in conjunction with both a camera and cinetoscope, or the device may be used with either one as occasion requires. The camera and cinetoscope may be of the usual, or any preferred types having a casing 10 through which a film 11 having the usual spaced apertures along its marginal edges is transmitted from a delivery reel, as 12, to a receiving reel, as 13. In the front wall of the casing 10 is a window 14 through which successive parts of the film is exposed to light focused from one or more lenses 15 provided in a barrel 16 arranged exteriorly of the front wall of the casing when the apparatus is in the form of a camera, and when the film is traveled through a cinetoscope the light is focused thereon through the window 17 in the rear wall of the casing from one or more lenses 18 arranged in a barrel 19 provided on a light house, as 20.

The film 11 may be transmitted through the machine from the delivery reel 12 to the receiving reel 13 by any well known form of mechanism, for instance the mechanism having a gear 21 held upon a drive shaft 22 which is rotated by a crank handle 23. The gear 21 is in mesh with a gear 24 which is freely rotatable on a stud 25, and in mesh with this freely rotatable gear is a pinion 26 held on one end of a shaft 27 journaled in the side walls of the casing 10. On the shaft 27 in proximity to its other end is a bevel gear 28 which is in mesh with a bevel gear 29 on the end of a shaft 30 journaled in the front wall of the casing. The shaft 30 extends some distance outwardly of the casing, and on this end of the shaft is a shutter 31 of any suitable form adapted to be revolved across the plane of the exposures of the film. Also journaled in the side walls of the casing 10 and in spaced parallel arrangement with relation to the shaft 27 is a shaft 32, and on the central part of the shaft 32 are two spaced sprockets 33 and 34 which engage the apertures of the film for transmitting it through the machine so as to travel from the delivery reel 12 over an idler 35, over a freely rotatable sprocket 36 provided in the upper part of the casing and through a suitable form of framing device 37 arranged at one of the exposure windows of the machine. From the sprockets 33 and 34 the film passes over an idler 38, over a guide 39, and is delivered to the receiving reel 13. When the drive shaft 22 is driven the gear 21 will revolve the gear 24 to rotate the pinion 26, and the shaft 27. Rotation will thereby be imparted to the bevel gears 28 and 29, and to the shaft 30 for revolving the shutter 31.

In order to rotate the shaft 32 for operating the sprockets 33 and 34 when the drive shaft 22 is driven whereby the film may be transmitted through the machine as well as being intermittently checked, a Geneva movement, as 40, is provided. The Geneva movement 40 may be of a well known form having a disk 41 from one face of which extends a smaller circular plate 42 provided with two spaced notches 43 and 44 in one part of its edge, and extending from the same face of the disk midway between the notches 43 and 44 is a pin 45. The disk 41 and the guide plate 42 are rigidly held upon the shaft 27. On the shaft 33 is a star-plate 46 provided with the usual notches, as 47, and this star plate is in movable contact with the edge of the circular plate 42. As is incident to the operation of this class of devices when the shaft 27 and the disk 41 are rotated the pin 45 will be guided consecutively in the notches 47 of the star-plate. The shaft 32 together with the sprockets 33 and 34 will then be intermittently rotated for correspondingly checking the transmission of the film through the machine so as to receive its successive exposures.

For the purpose of subjecting the exposures of the film to the action of colored rays of light when the pictures are taken on the sensitized film as well as when the images are projected whereby the natural colors of the objects will be recorded on the film and will be subsequently exhibited in a similar manner on a screen, in the machine is provided a transparent screen in the form of a rigid plate, as 48, which is adapted to be intermittently reciprocated in a vertical direction across the plane of the exposures of the film during its intermittent transmission before the lens. The transparent color-screen 48 is composed preferably of two successive color-divisions, each representing separate colors, such as red and green, as 49 and 50, and this color-screen may be inclosed in a frame 51 which is reciprocably moved between spaced vertical guides 52 and 53 arranged in the casing of the machine so as to be spaced from the film. Each of the color divisions of the screen is approximately the same size or may be slightly larger than the dimensions of the windows of the casing of the machine so that the full extent of the area of the exposures of the film will be effected by each color division.

Serving to permit the color-screen 48 to be operated in unison with the operation of the means for transmitting the film so that the screen will be reciprocated simultaneously and at the same speed as the film is traveled, the lower part of the frame 51 of the screen is pivoted to one end of a link 54 having its other end pivoted to one end of the transversely disposed bar 55 having its central part pivoted, at 56, to one of the walls of the casing 10. The other end of the bar 55 is pivoted to the upper end of a vertically disposed rod 57 having its lower end pivoted to one end of a second transverse bar 58 which is disposed in spaced parallel arrangement to the transverse bar 55. The central part of the bar 58 is pivoted, at 59, to one of the walls of the casing 10, and the opposite end of this bar is pivoted to one end of an arm 60 having its other end eccentrically pivoted to a disk 61 held on one end of a shaft 62 which is journaled in the walls of the casing of the machine. On the other end of the shaft 62 is a pinion 63 in mesh with a gear 64 held upon the shaft 32 of the sprockets 33 and 34. By providing the pinion 63 and the gear 64 of suitable diameters the shaft 62 and the disk 61 will be revolved to operate the arm 60, bar 58, rod 57, bar 55, and the link 54 so that the color-screen 48 will be reciprocated at the same speed as the travel of the film, and through the medium of the intermittent device, or Geneva movement 40 the reciprocatory movement of the color-screen will be intermittently checked synchronously with the intermittent checking of the transmission of the film. Moreover, by suitably constructing these parts of the operating mechanism of the color-screen each color division thereof will alternately register with the exposure window of the machine, and as the screen is thus reciprocated intermittently across the plane of the exposures of the sensitized film each successive exposure will be alternately affected by each color division so that the natural colors of the objects photographed will be recorded on the negative. After the negative is converted to a positive by any of the well known means the pictures may be projected in their natural colors on a screen in a similar manner, care being exercised so that the color divisions of the screen occupy corresponding positions relatively to the pictures of the positive as they occupied when the negative was produced.

In the foregoing description, we have embodied the preferred form of our invention, but we do not wish to be understood as limiting ourselves thereto, as we are aware that modifications may be made therein without departing from the principle, or sacrificing any of the advantages of this invention, therefore we reserve to ourselves the right to make such changes as fairly fall within the scope of the appended claims.

Having thus described our invention, we claim as new and desire to secure by Letters Patent:—

1. In a cinematographic device, the combination with means for transmitting a film before an exposure opening, of a color screen having complementary color divisions and adapted to be reciprocated across the path of exposure of the film, and intermittently operated means for transmitting said film before the exposure opening, and an eccentric operated by said intermittently operated means for moving said color screen in synchronism with said film.

2. In a cinematographic device, the combination with a film arranged for transmission before an exposure opening, of a color screen having complementary color divisions and adapted to be moved across the path of exposure of the film, and intermittently operated means for transmitting said film before the exposure opening, an eccentric operated by said intermittently operated means, and a plurality of levers operated by said eccentric for moving the color screen in synchronism with the film.

This specification signed and witnessed this fifth day of March A. D. 1914.

FREDERICK W. HOCHSTETTER.
EDMUND HUGH PRYCE.

Witnesses:
ROBT. B. ABBOTT,
M. DERMODY.